United States Patent
Kim (10) Patent No.: US 12,470,539 B2
(45) Date of Patent: Nov. 11, 2025

(54) AUTHENTICATING A NETWORKED CAMERA USING A CERTIFICATE HAVING DEVICE BINDING INFORMATION

(71) Applicant: HANWHA TECHWIN CO., LTD., Seongnam-si (KR)

(72) Inventor: Youngsam Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

(21) Appl. No.: 18/158,197

(22) Filed: Jan. 23, 2023

(65) Prior Publication Data

US 2023/0164136 A1    May 25, 2023

Related U.S. Application Data

(63) Continuation of application No. 16/137,961, filed on Sep. 21, 2018, now abandoned.

(30) Foreign Application Priority Data

Sep. 21, 2017   (KR) ........................ 10-2017-0122089

(51) Int. Cl.
*H04L 9/40*       (2022.01)
*H04L 9/32*       (2006.01)
*H04N 7/18*       (2006.01)

(52) U.S. Cl.
CPC ........ *H04L 63/0823* (2013.01); *H04L 9/3268* (2013.01); *H04L 63/0876* (2013.01);

(Continued)

(58) Field of Classification Search
CPC . G06F 21/44; H04L 63/0823; H04L 63/0876; H04L 63/105; H04L 63/126;

(Continued)

(56) References Cited

U.S. PATENT DOCUMENTS 9,641,344 B1    5/2017 Kim
10,511,448 B1 *  12/2019 Brinskelle ............. H04L 63/166

(Continued)

FOREIGN PATENT DOCUMENTS

KR    10-2009-0071307 A    7/2009
WO    2012/046907 A1    4/2012

OTHER PUBLICATIONS

Communication dated Jan. 31, 2019, issued by the European Patent Office in counterpart European Application No. 18195937.0.

(Continued)

*Primary Examiner* — Theodore C Parsons
(74) *Attorney, Agent, or Firm* — McLean IP Global; Jason Y. Pahng (57) ABSTRACT

A device authentication method includes: connecting to a device such as a camera through a network; receiving, from the device, a certificate of the device including device binding information about the device; sending, to the device, a device management message for administration level authentication; receiving, from the device, device information about the device in response to the administration level authentication being successful; determining whether the certificate is valid based on the device binding information and the device information; and establishing a protected communication session with the device in response to the certificate being determined to be valid.

13 Claims, 8 Drawing Sheets

(52) U.S. Cl.
CPC .......... *H04L 63/105* (2013.01); *H04L 63/126* (2013.01); *H04N 7/18* (2013.01)

(58) Field of Classification Search
CPC ... H04L 63/166; H04L 9/3247; H04L 9/3268; H04N 7/18
See application file for complete search history.

(56) References Cited

U.S. PATENT DOCUMENTS

| | | | | |
|---|---|---|---|---|
| 2011/0252227 | A1* | 10/2011 | Strong | H04L 63/166 |
| | | | | 713/168 |
| 2017/0034700 | A1* | 2/2017 | Cohen | H04W 12/50 |
| 2017/0201383 | A1* | 7/2017 | Kim | H04L 9/006 |
| 2019/0104251 | A1* | 4/2019 | Otsuki | H04L 9/3247 |
| 2023/0164136 | A1* | 5/2023 | Kim | H04L 63/0876 |
| | | | | 726/6 |

OTHER PUBLICATIONS

Dierks, T. et al., "The TLS Protocol", Version 1.0, RFC 2246, Jan. 1999, The Internet Society. (80 pages total).

Cooper et al., rfc5280—Internet X.509 Public Key Infrastructure Certificate and Certificate Revocation List (CRL) Profile (IETF May 2008 (Year: 2008).

\* cited by examiner

AUTHENTICATING A NETWORKED CAMERA USING A CERTIFICATE HAVING DEVICE BINDING INFORMATION

CROSS-REFERENCE TO THE RELATED APPLICATION

This is a continuation of U.S. application Ser. No. 16/137,961 filed Sep. 21, 2018, which claims priority from and the benefit of Korean Patent Application No. 10-2017-0122089, filed on Sep. 21, 2017, in the Korean Intellectual Property Office, the disclosures of which are incorporated herein by reference in their entireties.

BACKGROUND

1. Field

Apparatuses and methods consistent with the exemplary embodiments of the inventive concept relate to authenticating a networked camera using a certificate having device binding information.

2. Description of the Related Art

Digital certificates of a public key infrastructure (PKI) system are widely used for protected communications over a public network, such as Internet, in which a plurality of entities can access. An entity that wants to be assured as a trustworthy party by other entities in a network communication generates a public key and provides the public key to a certificate authority, and the certificate authority issues a certificate for the entity which contains a digital signature of the certificate authority. Then, the other entities of the network communication can authenticate the entity by validating the certificate issued for the entity, and prevent an unauthorized access based on the authentication result to protect the network communication.

A simple validation of a certificate chain proves that a specific certificate is issued by a trusted certificate authority. However the chain validation is not enough to confirm whether a specific certificate was originally issued for a specific server to which a connection will be established. Thus, if a network host has a certificate that contains a domain name of the network host, a network client can check whether the domain name used to connect to the network host is the same as a domain name contained in the certificate received from the network host.

Also, other than simply checking the domain name in the certificate issued for the network host, a method called certificate pinning may be used to prevent a risk of certificate change in the network host, where the network client uses pre-stored information about the certificate.

The certificate pinning method is used as a measure preventing a risk of certificate change, in which the network host receives a certificate with a domain name from a trusted certificate authority and registers information about the certificate combined with the domain name in advance for a future authentication process. However, this certificate pinning method is not applicable to a network host or a device operating without any domain name assigned. This certificate pinning method also has a risk that other devices with the same domain name of one device can use a certificate issued for the device because, under a domain name system which is a logical addressing system, a domain name can be assigned to a plurality of devices, and therefore, a device is allowed to use the same domain name that was used for another device.

Thus, there is a need for an alternative device-unique authentication given the situation that a camera device and a management device are connected via a public network and the management device needs to validate whether a particular camera device as being a communication peer is allowed or registered.

SUMMARY

Exemplary embodiments of the inventive concept provide device authentication methods and related devices.

According to an exemplary embodiment, there is provided a device authentication method which may include: connecting to a device such as a camera through a network; receiving, from the device, a certificate of the device including device binding information about the device; sending, to the device, a device management message for administration level authentication; receiving, from the device, device information about the device in response to the administration level authentication being successful; determining whether the certificate is valid based on the device binding information and the device information; and establishing a protected communication session with the device in response to the certificate being determined to be valid.

The device information may include identification information about the device for identifying the device from other devices. The device binding information may represent that the certificate was issued for the device identified by the device information. The device information may include at least a part of a Medium Access Control (MAC) address of a communication interface of the device. The device information may include information about a component constituting the device. The determining whether the certificate is valid may include: determining whether the device binding information includes the device information; and determining whether a digital signature of a certificate authority issuing the certificate is valid. The determining whether the certificate is valid may include: generating pinning information about the certificate received from the device; and determining whether the generated pining information matches pre-stored pinning information about the device. When the administration level authentication is successful, system configuration information about the device may be received.

According to an exemplary embodiment, there is provided a camera authentication method which may include: receiving, from a management device, a request to connect to a camera; receiving, from the management device, a device management message for administration level authentication; sending, to the management device, device information about the camera corresponding to an access class allowed to read system configuration information about the camera in response to the administration level authentication being successful; sending, to the management device, a certificate comprising device binding information about a camera; and establishing a protected communication session with the management device based on a result of determining whether the certificate is valid at the management device.

According to an exemplary embodiment, there is provided a management device for a camera which may include: a communication interface configured to communicate with the camera; a storage configured to store device information about the camera; and a controller configured to control the communication interface to establish a protected communication session with the camera based on a result of checking a validity of a certificate received from the camera, wherein the controller is further configured to determine whether the certificate is valid based on the device information stored in the storage and the device binding information included in the certificate.

The controller may be configured to: determine whether the device binding information comprises the device information stored in the storage; and validate the certificate by determining whether a digital signature of a certificate authority issuing the certificate is valid. The certificate may be expressed in the form of X.509v3, and the device binding information may be included in a SubjectPublickeyInfo field or an extension field. The storage may be configured to pre-store pinning information about the camera, and the controller may be further configured to generate pinning information about the certificate received from the camera, and determine whether the generated pinning information about the certificate matches the pre-stored pinning information about the camera. The control unit may be further configured to control the communication interface establish the protected communication session via SSL (Secure Socket Layer) protocols in response to validating the certificate.

According to an exemplary embodiment, there is provided a camera which may include: a communication interface configured to communicate with a management device; an image sensor configured to capture image data; a storage configured to store a certificate comprising device binding information generated based on device information about the camera, and store a public key included in the certificate and a private key generated to have a cryptographic relation with the public key; and a controller configured to control the communication interface to: receive a connection request from the management device; send the certificate to the management device; and establish a protected communication session with the management device according to a result of determining that the certificate of the camera is valid at the management device based on the device binding information and the device information.

The device information may include identification information about the camera to identify the camera from other devices. The device information comprises at least a part of a MAC address of the communication interface of the camera. The determining that the certificate of the camera is valid may be performed by: determining whether the device binding information comprises the device information; determining whether a digital signature of a certificate authority issuing the certificate is valid; and determining whether pinning information about the certificate matches pre-stored pinning information about the camera.

According to exemplary embodiments, when devices on a network wish to establish a protected communication session with other devices, the devices may use a certificate issued for a specific device to authenticate other devices, which will reduce a possible risk that a single certificate can be used for multiple devices.

According to exemplary embodiments, a device on a network may detect if a device specific certificate which is issued for a particular device is used on other devices based on information about a device binding certificate. According to exemplary embodiments, a management device may support issuance of the device binding certificate for a network camera, and may store certificate pinning information and install the device binding certificate in the network camera.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENT

It should be noted that the technical terms used in the present disclosure are used only to describe specific embodiments and are not intended to limit the technical idea disclosed in the present disclosure. In addition, unless otherwise defined in the present disclosure, the technical terms used in the present disclosure should be construed in a sense that is generally understood by those having ordinary skill in the art to which the technology disclosed in the present disclosure belongs, and should not be construed in an excessively broad sense, or in an excessively narrow sense. In addition, when the technical term used in the present disclosure is a misleading technical term that does not accurately describe the technical idea disclosed in the present disclosure, the technical term should be understood to be replaced by technical term that can be understood by those having ordinary skill in the art to which the technology disclosed in the present disclosure belongs. In addition, the general terms used in the present disclosure should be construed in accordance with the predefined or prior context, and should not be construed in an excessively narrow sense.

As used in the present disclosure, terms including an ordinal number, such as first, second, or the like may be used to describe various configuration elements, but the configuration elements should not be limited by the terms. The terms are used only for the purpose of distinguishing one configuration element from another configuration element. For example, a first configuration element may be referred to as a second configuration element without departing from the scope of the present disclosure, and similarly, the second configuration element may also be referred to as the first configuration element.

Hereinafter, embodiments of the present disclosure will be described with reference to the accompanying drawings in more detail, and the same or similar elements are denoted by the same reference numerals or symbols regardless of the reference numerals or symbols, and redundant description thereof will be omitted.

In addition, in the following description of the present disclosure, when it is determined that detailed description of the related known technology can obscure the gist of the technology disclosed in the present disclosure, the detailed description thereof will be omitted. In addition, it should be noted that the attached drawings are only for easy understanding of concept of the technology disclosed in the present disclosure, and the technical idea should not be construed as limited by the appended drawings.

Figure 1:
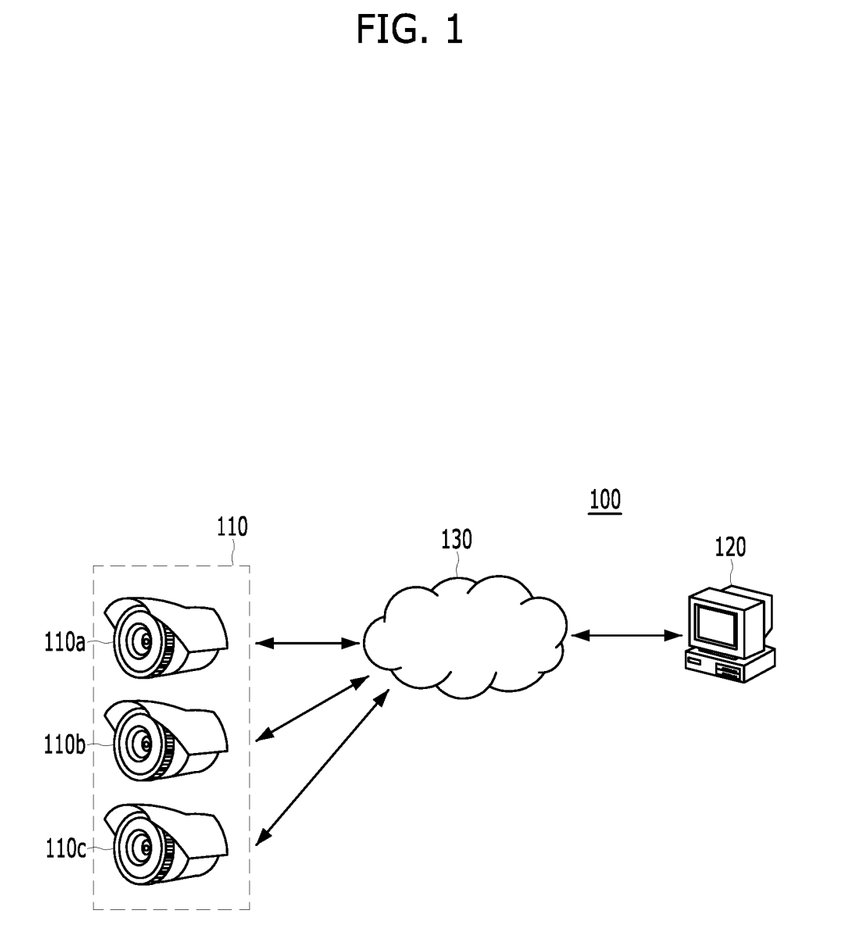
FIG. 1 illustrates a network camera management system according to an exemplary embodiment.

FIG. 1 illustrates a network camera management system according to an exemplary embodiment. The network camera management system 100 may include a camera 110 and a management device 120, and the camera 110 may include one or more camera devices 110a, 110b, and 110c.

The camera 110 may be connected to a network 130 wiredly or wirelessly to perform communication with other devices. The camera 110 according to the present embodiment described herein may be referred to as a surveillance camera or a closed-circuit television (CCTV), and may capture and transmit an image to the management device 120 through the network 130. The camera 110 may include a lens and an image sensor. The lens may be a lens group comprising one or more lenses. The image sensor can convert an image input through the lens into an electrical signal. For example, the image sensor may be a semiconductor device capable of converting an optical signal into an electrical signal (hereinafter referred to as an image) such as a charge-coupled device (CCD) or a complementary metal oxide semiconductor (CMOS). The surveillance camera may be a camera that provides images represented by RGB color models, infrared images or distance images containing distance information, and the like.

The management device 120 may store and manage images transmitted from the camera 110. The management device 120 according to the present embodiment may include one or more management devices. For example, the management device 120 may be implemented by any one of a video management system (VMS), a central management system (CMS), a network video recorder (NVR), and a digital video recorder (DVR). Also, the management device 120 may be implemented by a personal computer, a server or a portable device such as a smartphone, a notebook computer or a tablet. However, these implementations are presented as examples and are not limited thereto, and if a device is capable of receiving multimedia objects from one or more camera devices (110a, 110b, 110c, etc.) and displaying and/or storing them, it may be work as the management device 120 as described herein.

The network 130 according to an exemplary embodiment may be a wireless network, a wired network, a public network such as Internet, a private network, a global system for mobile communication network (GSM) network, a general packet wireless network a packet radio network (GPRS), a local area network (LAN), a wide area network (WAN), a metropolitan area network (MAN), a cellular network, a public switched telephone network PSTN, a personal area network, Bluetooth, Wi-Fi Direct, Near Field Communication (NFC), UltraWide band, a combination thereof, or any other network, and but it is not limited thereto.

In particular, when the network camera management system 100 described herein uses the camera 110 as a surveillance camera, the network 130 may be a private network different from a public network. The private network may not be connected to other networks or may be configured with a limited access so that the network camera management system 100 operates in an environment isolated from other devices. In this case, an authentication method for the camera 110 according to the exemplary embodiments presented herein can prevent a risk that an unauthorized device can be connected to the network 130.

Figure 2:
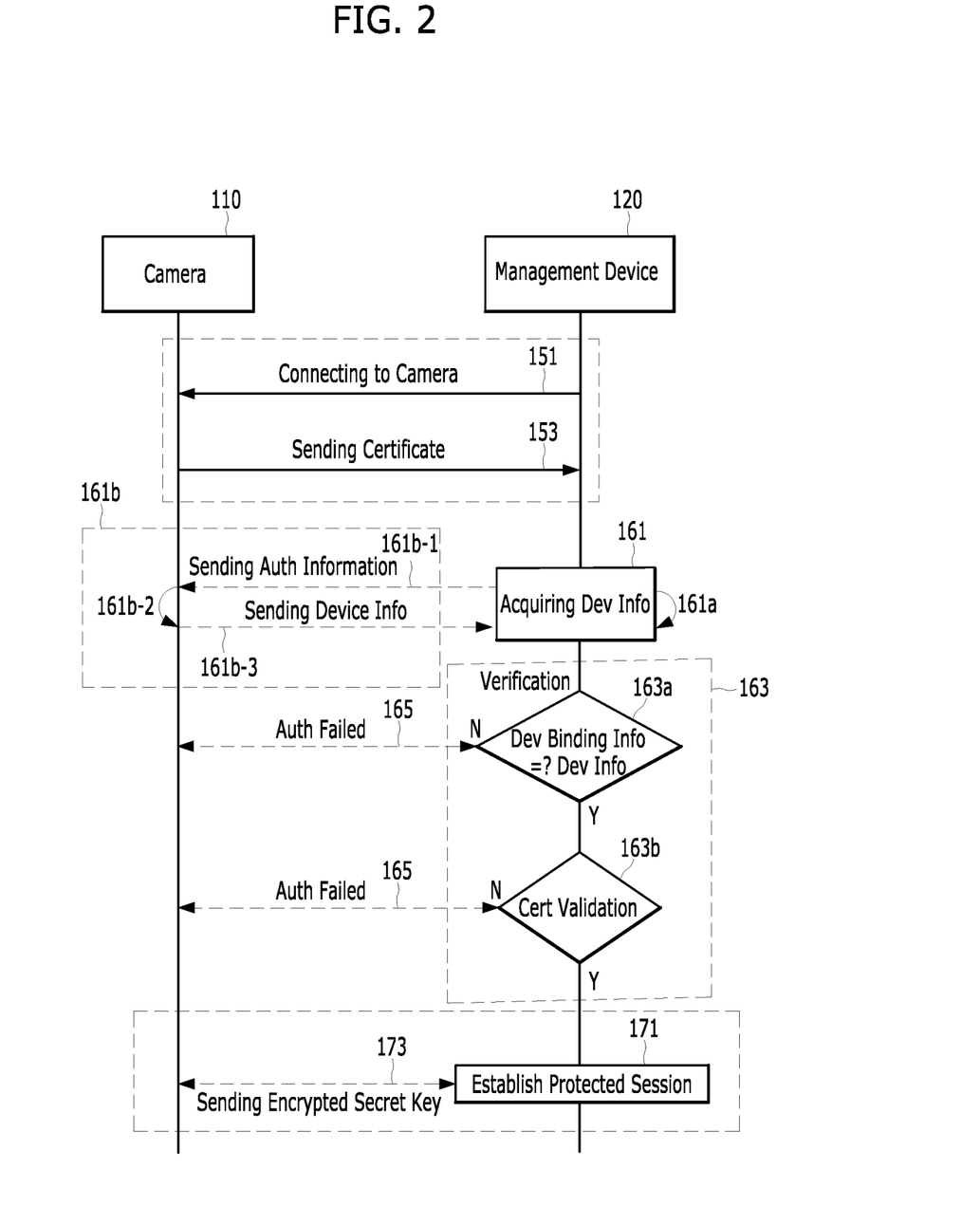
FIG. 2 is a flowchart illustrating an operation of the network camera management system of FIG. 1, according to an exemplary embodiment.

FIG. 2 is a flowchart illustrating an operation of the network camera management system of FIG. 1, according to an exemplary embodiment. The management device 120 authenticates the camera 110 in the network 130 to determine whether the camera 110 is authorized to communicate with the management device 120 through the network 130, and to this end the management device 120 determines whether a device binding certificate is valid, which will be described later herein. Communication protocols for a communication between the camera 110 and the management device 120 may include, for examples, Transmission Control Protocol (TCP)/Internet Protocol (IP) or Secure Socket Layer (SSL)/Transport Layer Security (TLS), but not limited thereto. In addition, the camera 110 and the management device 120 can communicate with each other via a web service-based protocol which can be used for interworking with other devices or media on the network 130. The camera 110 and the management device 120 may use the web service-based protocol to perform functions such as a discovery of other devices on a network, a network configuration, a device management, an event handling, etc. While using the web service-based protocol, the camera 110 and the management device 120 may exchange a device management message which may be represented in Web Services Description Language (WSDL).

In step 151, the management device 120 may establish a connection to the camera 110. For example, the management device 120 may establish a connection by sending a connection request to a web server running on the camera 110. In a general view of client-server structure, the management device 120 as a client performs a TCP session set-up process, TLS process and HTTP handshake process to connect to the camera 110 as a server. FIG. 2 describes that the management device 120 initiates a TCP/TLS connection. However, the camera 110 may send a connection request first to the management 120 to set up a connection therebetween.

The connection request of the management device 120 may be an initiation process of a TLS handshake with the camera. Specifically, in an SSL session, the management device 120 may authenticate a web service of the camera 110, and in this case, step 151 may include, for example, an operation in which the management device 120 transmits a "client hello" message to request set-up of an SSL session. The client hello message may include various information required for setting up an SSL session, for example, an SSL version number of the management device 120, cipher settings of a cryptographic algorithm, and other session-specific data. The SSL version number of the management device 120 may be a random number randomly generated by the management device 120.

In step 153, after accepting the connection request, the camera 110 may send a certificate to the management device 120. Step 153 may include, for example, an operation in which the camera 110 transmits a "server hello" message in response to the client hello message on the TLS handshake. The server hello message may also include various information, for example, an SSL version number of the camera 110, password settings, and other detailed data on the SSL session. The SSL version number of the camera 110 may also be a random number generated randomly by the camera 110. At this time, the camera 110 may include its certificate in the server hello message sent to the management device 120, or send the certificate to the management device separately from the server hello message.

The certificate sent from the camera 110 to the management device 120 may include device binding information, according to an exemplary embodiment. The device binding information is related to device information about the camera 110. The device information about the camera 110 corresponds to identification information about the camera 110 to identify the camera 110 from other devices. In one exemplary embodiment, the device information may comprise hardware information that is determined during the manufacture or assembly of the camera 110 to uniquely identify the camera 110 from among other devices. In another exemplary embodiment, the device information may include, for example, at least a part of Medium Access Control (MAC) address of a communication interface of the camera 110, which is known as a hardware address and relatively unique among network interface cards (NICs). In yet another exemplary embodiment, the device information may include other hardware specific information, such as, information about at least a part of components of the camera 110 such as a controller, a storage, a lens, an image sensor, etc., as long as the device information can identify the camera 110 from other devices.

The certificate may be expressed, for example, in the form of an X.509v3 or a variant thereof, and in such a case the device binding information may be included in a field such as SubjectPublickey Info or one of extension fields. However, it is not limited thereto and the device binding information may be included in various certificate types or fields.

The device binding information about the camera 110 may be inserted into the certificate when a certificate authority generates a digital signature at least partially based on the device information such as a MAC address of the camera 110. If the certificate including the device binding information about the camera 110 is used for a certificate validation process, a peer device may notice that the certificate with the device binding information was originally issued for the camera 110 with which the device binding information is associated. Also, a certificate including device binding information for a specific camera device may be referred to as a device binding certificate, device specific certificate, or device unique certificate. The device binding certificate may be used to determine whether a communication session is securely established with the camera 110 which is identified by the device information during the validation process of the device binding certificate, because the digital signature of the certificate was generated based on the device information about the camera 110.

In step 161, the management device 120 may acquire the device information about the camera 110 in order to verify validity of the certificate. In one exemplary embodiment, when the management device 120 has already stored the device information about the camera 110 in its storage, the device information may be obtained from the storage of the management device (optionally in step 161a). The management device 120 may pre-store the device information about the camera 110 in the storage unit in a process of registering the camera 110.

In another exemplary embodiment, if the management device 120 does not store the device information about the camera 110 in the storage, the device may request the camera 110 to send the device information to the management device 120 (optionally in step 161b). In one exemplary embodiment, step 161 to receive the device information about the camera 110 may be performed after step 151 for the connection establishment with the camera 110, and may be performed before or after step 153 in different implementations. In another exemplary embodiment, when an authentication process between the management device 120 and the camera 110 is performed independently from an operation such as SSL authentication, the management device 120 may receive the device information about the camera 110 from the camera 110 before step 151 for the connection establishment is carried out.

In one exemplary embodiment, the management device 120 may acquire the device information about the camera 110 through a web service provided by the camera 110. The camera 110 may support various commands for device management functions, such as a device management command, a discovery command, a device capability command, and a device configuration command to provide device information about the camera 110, and the management device 120 may request the device information about the camera 110 by sending a message including a command to request the device information about the camera 110 to the camera 110 or a command to request identification information that can be used as the device information about the camera 110. For example, a command to obtain the MAC address of the camera 110, GetNetworkInterface, may be included in the message requesting for the device information about the camera 110.

Meanwhile, in addition to the certificate validation to be performed by the management device 120, another authentication may be required locally within the camera 110 to access the device information about the camera 110. The camera 110 may request, for example, user authentication for the request from the device information from the management device 120. To this end, the management device 120 may send to the camera 110 user-based authentication information such as a Hypertext Transfer Protocol (HTTP) Basic authentication or digest authentication that can be used at an HTTP level. The camera 110 may perform a user-based access control based on the authentication information received from the management device 120. For example, based on the authentication information, a user may be classified into an administrator, an operator, a user, or anonymous. In addition, an access class is also classified into system configuration information (READ_SYSTEM), confidential information (READ_SYSTEM_SENSITIVE), etc., and also the camera device 110 may maintain an access policy indicating an authorized access class for each authenticated user. For example, when the request for the device information about the camera 110 is set to a system configuration information (READ_SYSTEM) level according to the access policy, if the user authentication information transmitted from the management device 120 is successful and passed as a request from an administrator, the camera 110 may acquire the device information about the camera 110 classified as the system configuration information and send the acquired device information to the management device 120. Therefore, in the procedure shown in FIG. 2, the management device 120 transmits a device management message for administrator-level authentication as authentication information to the camera 110 in step 161b-1, and the camera 110 determines whether the administrator-level authentication information is correct in step 161b-2, and when the administration-level authentication is successful, the device information about the camera 110 can be read from its system area and transmitted to the management device 120 within a range allowed according to the access policy in step 161b-3.

In step 163, the device 120 verifies whether the certificate 153 received from the camera 110 is valid with reference to the device information obtained as a result of step 161 for obtaining the device information.

Step 163 for the verification by the management device 120 may be a process of determining whether the certificate is valid, and in this case, it is determined whether the device binding information included in the certificate is generated based on the device information about the camera 110 (in step 163*a*) and whether the certificate is valid (in step 163*b*).

In one exemplary embodiment, the management device 120 may compare in step 163*a* whether the device information included in the device binding information corresponds to device information acquired by the management device through the step 161. To this end, the management device 120 can verify the digital signature of the certificate authority with respect to the device binding information, and can also perform certificate chain verification consequently. For example, the management device 120 may determine whether at least a portion of the device information is included in device binding information in the certificate.

Also, in one exemplary embodiment, in step 163*b*, the management device 120 may compare certificate information which is pre-stored with certificate information received from the camera 110 in order to verify whether the certificate is valid. The certificate information used in this comparison may include, for example, hash data generated based on at least a part of the certificate. Such certificate information to be used in step 163*b* may be referred to as pinning information about the certificate or fixing information about the certificate. In other words, the comparison of the certificate information in step 163*b* may be performed simply by comparing hash data of the certificate received from the camera 110 with hash data of the certificate which is pre-stored or pre-registered in order to determine whether data of the certificate itself has been changed maliciously or arbitrarily.

To this end, the management device 120 may store the certificate information about the camera 110 in advance. In one exemplary embodiment, the management device 120 may generate and store the hash data using the certificate received from the camera 110 when initially communicating with the camera 110. In another exemplary embodiment, the management device 120 may generate the hash data after receiving the certificate of the camera 110 through a separate channel (out of band) or the management device 120 may receive the hash data generated in another device and store it. In yet another exemplary embodiment, the management device 120 may generate and store the hash data in the process of performing an issuance request and an installation of the certificate on behalf of the camera 110, which will be described below referring to FIGS. 4 and 5. The management device 120 may determine that the certificate is valid if the hash data of the received certificate is the same as the hash data of the camera 110 that is stored previously. Even if the device binding information in the certificate includes the device information about the camera 110 and the certificate was issued from the trusted certificate authority, it is not necessarily regarded as a valid certificate if the hash data of the certificate is not pre-stored. In such a case, storing the certificate information in the management device 120 in advance to be used for the future authentication may be referred to as pinning of the certificate.

A result of the authenticating the camera 110 by the management device 120 turns out to be unsuccessful if the device information included in the device binding information is different from the device information acquired by the management device 120 in step 161 (step 163*a*), or if the certificate is not valid (step 163*b*), whereby the authentication of the camera 110 in which the certificate is installed fails, and the camera 110 is not regarded as a legitimate network entity.

The result of the validation of the certificate by the management device 120 may be determined to be successful if the device binding information included in the certificate includes at least a part of the device information about the camera 110, the pinning information about the certificate matches pinning information pre-stored in the management device 120, and other items in the certificate are also valid. Thereafter, the management device 120 may establish a protected session with the camera 110 in step 171.

For example, the management device 120 needs to ensure confidentiality within the protected session, and to this end the management device 120 generates a random number to prevent a replay attack, and performs a key derivation function based on the random number to generate a master key or a secret key for securing the SSL session. Thereafter, the management device 120 can encrypt the master key or the secret key based on the public key of the camera 110, and transmit the encrypted secret key to the camera 110 to share the secret key for the protected session with each other (in step 173). A protected communication can then be established on subsequent SSL sessions.

Figure 3:
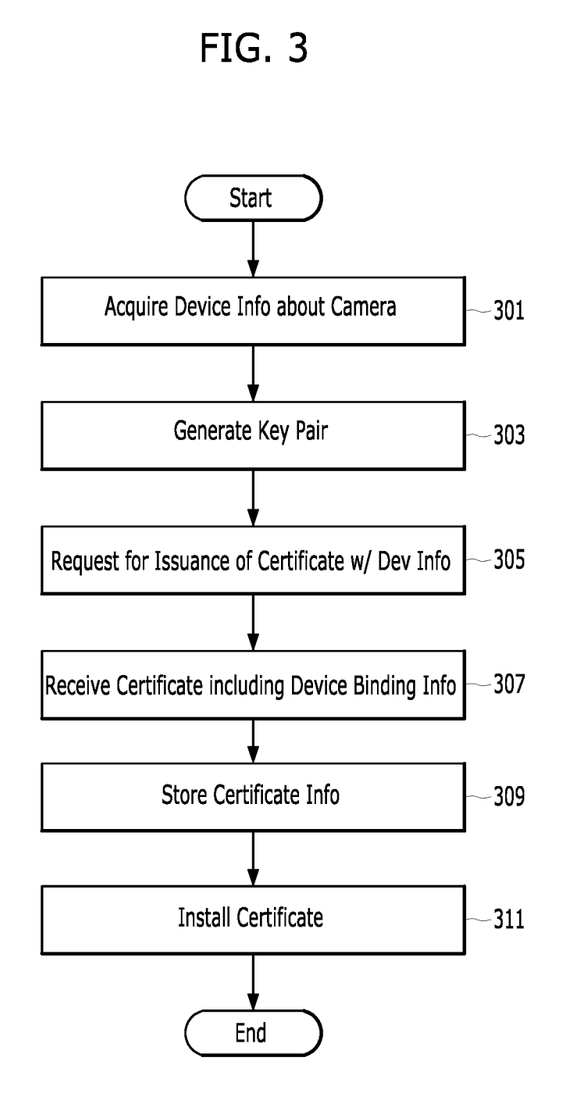
FIG. 3 is a flowchart showing a method for installing a certificate including device binding information in a camera, according to an exemplary embodiment.

FIG. 3 is a flowchart of a method of installing a certificate including device binding information in a camera through a deployment device, according to an exemplary embodiment. The certificate installation method described below can be performed during a manufacturing process of the camera 110 or when the camera 110 is first registered with the management device 120.

In one exemplary embodiment, a deployment device may issue a certificate for the camera 110 and install it in the camera 110. To this end, the deployment device acquires the device information about the camera 110 in step 301. The deployment device may store the device information.

The device information may be identification information about the camera 110 that can be used to distinguish the camera 110 from other devices. In one exemplary embodiment, the device information may include at least a part of the MAC address of a communication interface included in the camera 110. In another exemplary embodiment, the device information may be generated based further on at least a portion of components included in the camera such as a controller, a storage, a lens, an image sensor, etc. In yet another exemplary embodiment, the device information may be information representing hardware features of the camera 110 or information obtained from the components not removable from the camera 110.

The deployment device generates a key pair to be installed in the camera 110 in step 303. The key used in the camera authentication method disclosed herein is a key pair that can be used in a Public Key Infrastructure (PKI) based security protocol, and includes a pair of a private key and a public key to perform functions such as encryption/decryption, electronic signature/verification, and the like.

Generally, a public key algorithm can be used to provide confidentiality of data. Namely, if a specific user or device encrypts data using the public key of the specific user or device, only the specific user or device may decrypt the encrypted data using a private key which is cryptographic association with the public key, whereby the encrypted data is only accessible by the specific user or device. Likewise, among the key pairs generated by the public key algorithm, a signature that is signed using the private key of the specific user or device can be verified by a corresponding public key, and digital signature and verification are enabled using such properties of the cryptographic keys.

In step 305, the deployment device requests the certificate authority to issue a certificate based on the device information acquired in step 301 and the public key generated in step 303. The certificate authority generates a digital signature on data including the device information so that the certificate including the digital signature can be used only for a specific device associated with the device information. The device information included in the generated certificate may be referred to as device binding information because the certificate can be used only for the specific device, i.e., the camera 110.

In step 307, the deployment device receives a certificate including the device information from the certificate authority. The certificate received from the certificate authority may be referred to as a device binding certificate. In step 309, the deployment device stores information about the certificate so that it can be used for authenticating the camera 110 in the future. In the authentication process of the camera 110, this certificate information may be called device pinning information because it can be used only for the specific device, i.e., the camera 110. The deployment device inserts the device pinning information into the camera 110 to install the certificate in the camera 110 in step 311, so that the device pinning information can be used in the authentication process thereafter.

In one exemplary embodiment, the deployment device may be implemented as the management device 120 or the camera device 110 described above referring to FIG. 1 and FIG. 2. In another exemplary embodiment, the deployment device may be implemented as the management device 120 or a device used during a manufacturing process of the camera 110 which performs installation of the certificate.

Figure 4:
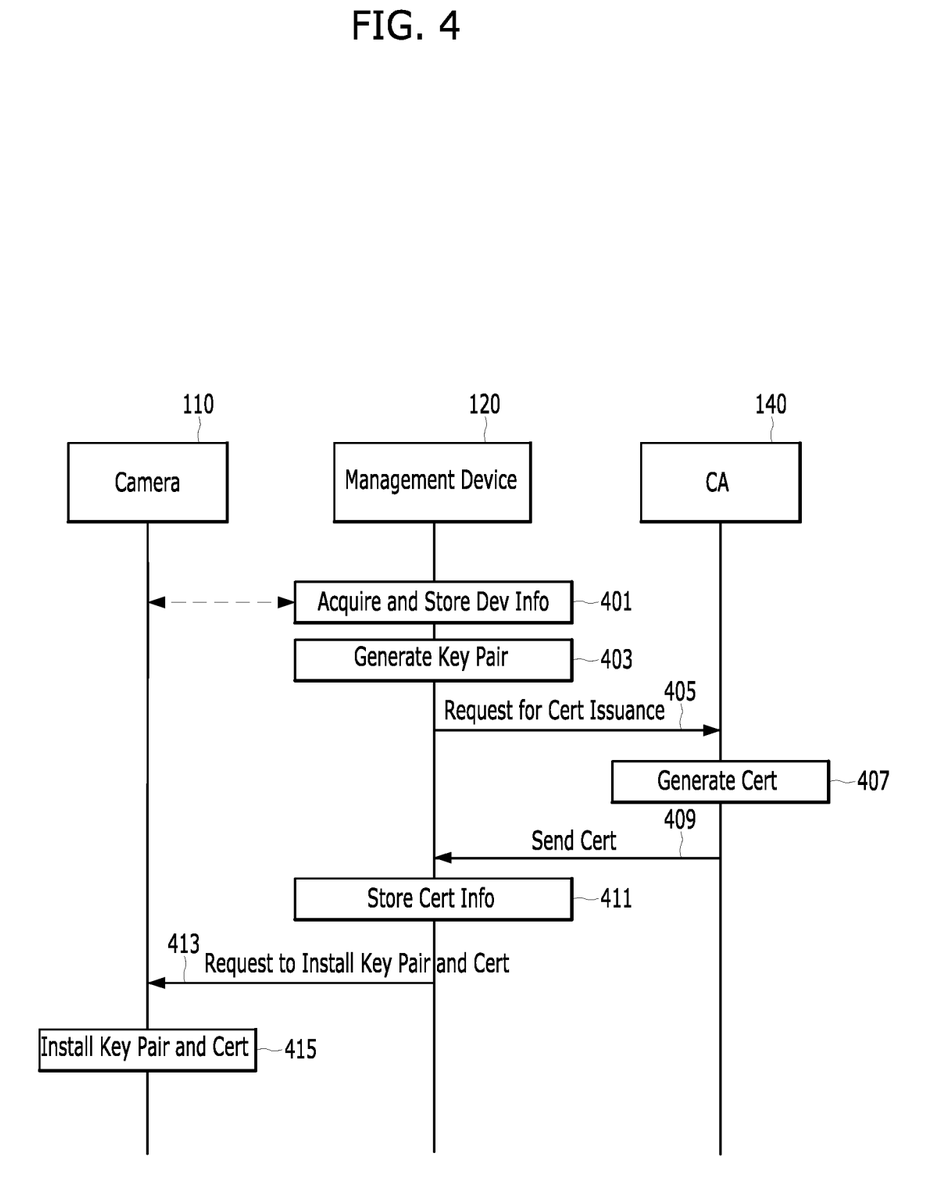
FIG. 4 is a flowchart showing a method for installing a certificate including device binding information in a camera, according to an exemplary embodiment.

FIG. 4 is a flowchart illustrating a method of installing a certificate including device binding information in a camera, according to an exemplary embodiment. The management device 120 may install a key and a certificate at the time of initial registration of the camera 110. Hereinafter, the detailed descriptions that are redundant will be omitted.

In step 401, the management device 120 acquires device information about the camera 110 and stores the acquired device information in its storage for the camera authentication operation as described with reference to FIG. 2. In step 403, the management device 120 generates a PKI-based key pair, and, in step 405, requests a certificate authority 140 to issue a certificate based on the device information and the public key. In step 407, the certificate authority 140 creates the certificate including device binding information by generating a digital signature on data including the device information. Then, in step 409, the management device 120 receives the certificate from the certificate authority, and, in step 411, stores certificate information about the certificate, which may be, for example, in the form of hash data of the certificate. A method of preventing a malicious or arbitrary change of the certificate of the camera 110 in a later authentication process by storing the hash data of the certificate may be referred to as device pinning. The hash data of the certificate may be certificate pinning information that pins or fixes the certificate to the camera 110. The management device 120 then requests the camera 110 to install the key pair and the certificate in step 413. The camera 110 may install the key pair and certificate in its storage (not shown) in step 415, so that the certificate can be used when the management device 120 performs a device authentication of the camera 110 for secure communication with the camera 120.

The certificate authority 140 is an organization generating a digital signature on data including the device information and the public key of the camera 110 or a server performing such an operation. The certificate authority 140 may include a private certificate authority as well as an accredited certificate authority.

Figure 5:
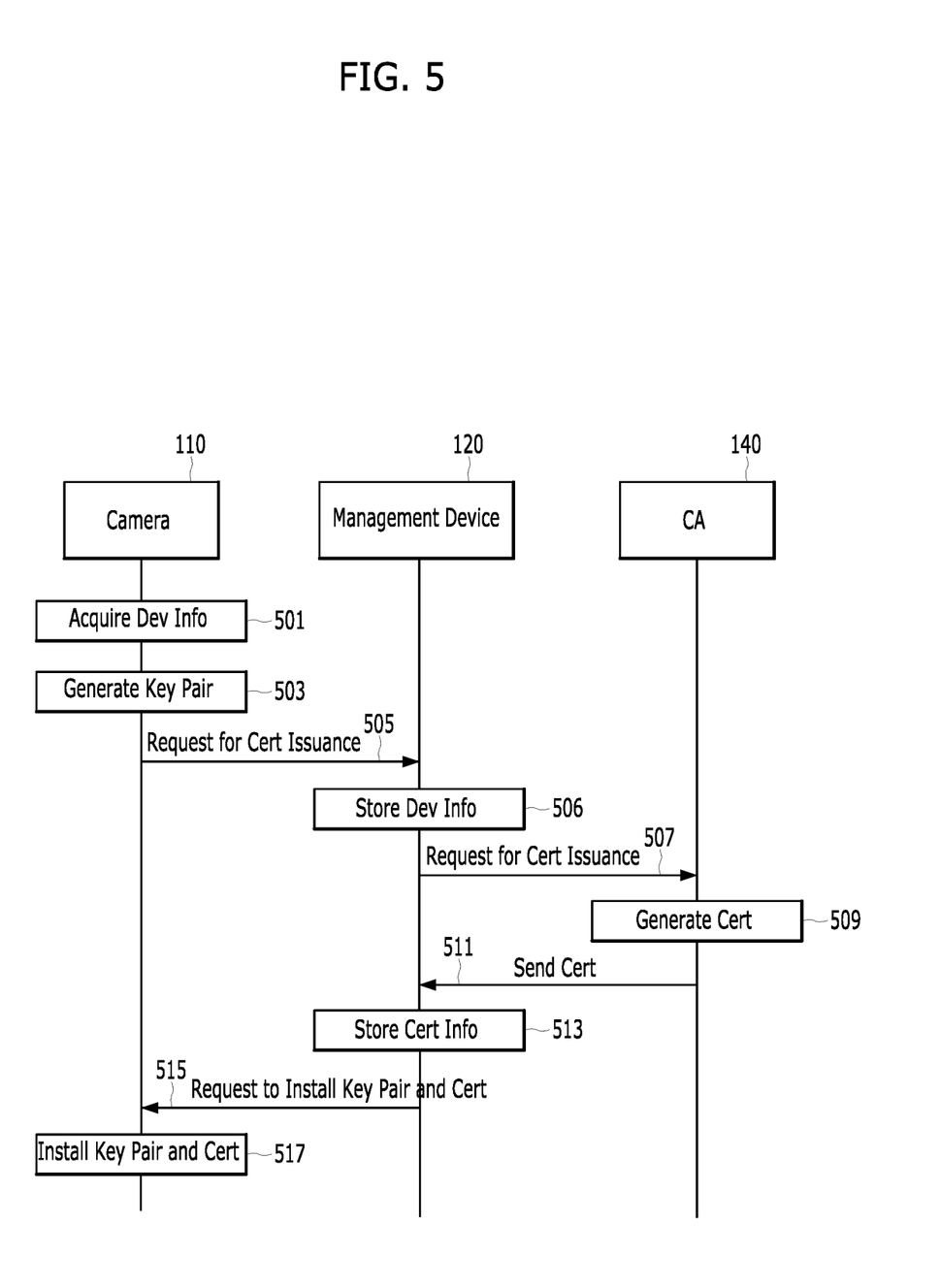
FIG. 5 is a flowchart showing a method for installing a certificate including device binding information in a network camera according to another embodiment.

FIG. 5 is a flowchart illustrating a method of installing a certificate including device binding information in a camera, according to an exemplary embodiment. Unlike in the previous exemplary embodiment described with reference to FIG. 4, the camera generates a key pair in the certificate installation method of FIG. 5.

In steps 501 and 503, the camera 110 acquires its device information and generates a PKI-based key pair. In step 505, the camera 110 requests the management device 120 to issue a certificate based on the device information and the public key. Upon receiving the request, the management device 120 stores the device information for a camera authentication operation in the future in step 506, and relays the certificate issuance request to the certificate authority 140 in step 507. Then, the certificate authority 140 generates a certificate including device binding information by generating a digital signature on data including the device information in step 509. The management device 120 then receives the certificate from the certificate authority in step 511, pins or fixes the certificate by storing pinning information about the certificate such as hash data of the certificate in step 513, and requests the camera 110 to install the key pair and the certificate in step 515. The camera 110 may install the key pair and the certificate in its storage in step 517 so that the certificate can be used when the management device 120 performs device authentication of the camera 120 for secure communication with the camera 120.

In another exemplary embodiment, the deployment device acquires a large amount of device information in advance for a plurality of cameras, generate a large number of key pairs as well, and then sends the keys to a certificate authority for each of the cameras. Thereafter, the deployment device may use a large number of sets of the device information, the certificate and the key pair to install them all at once in the cameras during mass production of the cameras.

In one exemplary embodiment, the management device 120 may perform a separate operation of requesting device information for a camera authentication operation. For example, if the management device 120 is not involved in the certificate issuance process unlike in the embodiment of FIG. 5, the management device 120 may request the camera 110 to send device information before the management device 120 verifies validity of the device binding certificate. Specifically, when the management device 120 receives a device binding certificate in a handshake process to perform a secured communication with the camera 110 such as SSL, the management device may request the camera 110 to send the device information. The management device 120 receives the device information from the camera 110, and determines the validity of the device binding certificate based on the device information. According to the implementation, the management device 120 may establish a connection with the camera 110 and then request the device information, and may receive the device information in response thereto.

Figure 6:
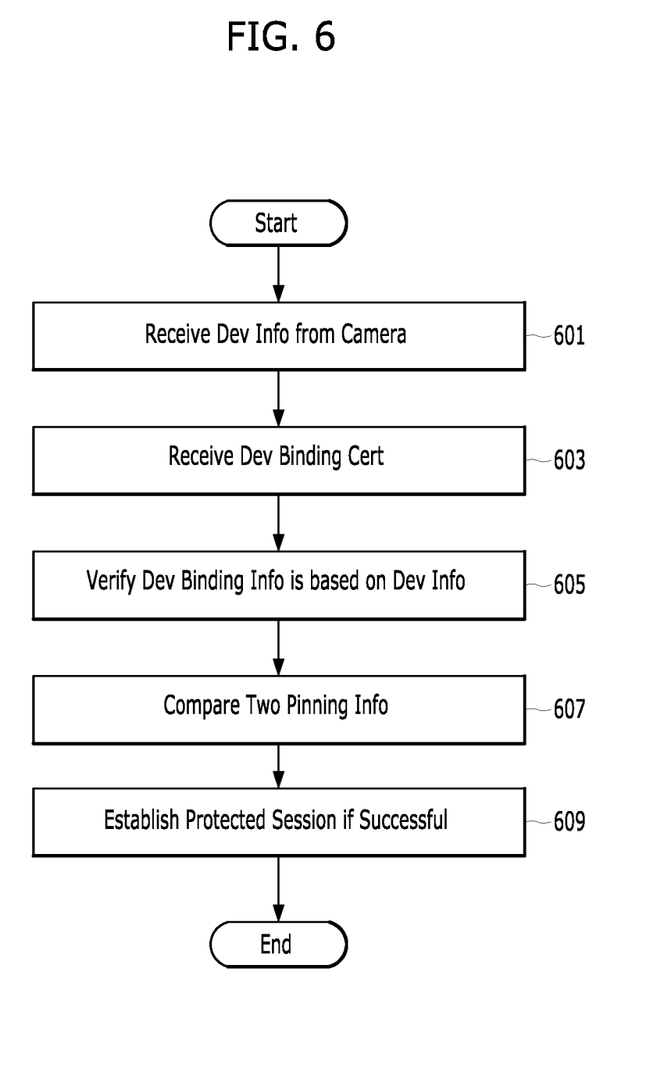
FIG. 6 illustrates steps to authenticate a camera, according to an exemplary embodiment.

FIG. 6 illustrates steps to authenticate a camera, according to an exemplary embodiment. An authentication method disclosed with reference to FIG. 6 is an example operation of the network camera management system of FIG. 2, and detailed descriptions that are redundant will be omitted.

In step 601, the management device 120 receives device information about the camera 110 from the camera 110. The device information is identification information about the camera 110 to uniquely identify the camera 110 from other devices. The device information may include at least some hardware information that is set during a manufacturing and/or assembling process of the camera 110. The device information may include at least a part of, for example, a MAC address of a communication interface included in the camera 110, and may include information about at least a part of components of the camera 110.

In step 603, the management device 120 receives a device binding certificate from the camera 110. The device binding certificate is data issued to include device information about the camera. For example, the device binding certificate may be issued by a certificate authority an include a digital signature on data including device information about the camera. In one exemplary embodiment, step 603 of receiving the device binding certificate may be performed prior to step 601 of receiving the device information about the camera 110.

In step 605, the management device 120 determines whether device binding information in the device binding certificate has been generated based on the device information. The management device 120 can verify the device binding certificate based on the device binding information in the device binding certificate and the device information received from the camera 110. If the device information included in the device binding information does not match the device information received from the camera 110, the management device 120 may stop an authentication process and send to the camera 110 information about the failure of the authentication process.

In step 607, the management device 120 determines whether pinning information about the device binding certificate matches pinning information pre-stored in the management device 120. The management device 120 generates the pinning information about the device binding certificate when acquiring the device binding certificate from the camera 110, for example, when initially registering or installing the camera 110 in the network 130, or when receiving the device binding certificate from the camera 110 for the first time, and the management device 120 fixes the device binding certificate to the camera 110 by storing the pinning information in its storage together with identification information or device information about the camera 110. In one exemplary embodiment, the pinning information about the device binding certificate may be a hash data for the device binding certificate. The management device 120 verifies validity of the received device binding certificate by determining whether the device binding certificate received in the authentication process matches the previously stored pinning information.

In step 609, the management device 120 establishes a protected session with the camera 110 if it is determined that the pinning information about the device binding certificate matches the pre-stored pinning information. The management device 120 may generate a master key or a secret key for communication in a protected session, and encrypt the secret key with a public key of the camera 110 included in the device binding certificate, and transmit the encrypted secret key to the camera 110.

Figure 7:
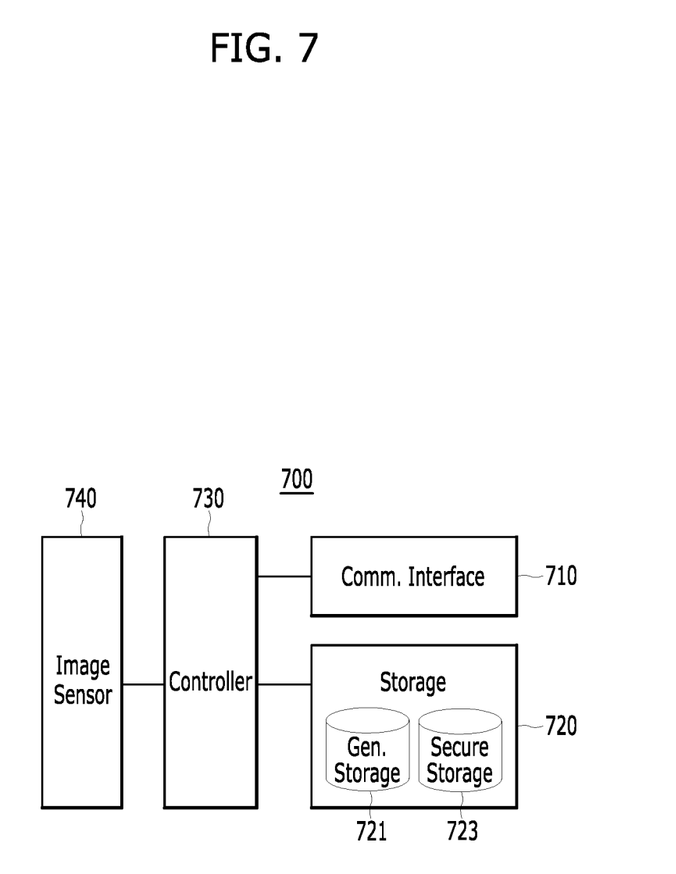
FIG. 7 is a block diagram of a camera according to an exemplary embodiment.

FIG. 7 is an exemplary block diagram of a camera according to an exemplary embodiment. A camera 700 according to an exemplary embodiment may include a communication interface 710, a storage 720, a controller 730, and an image sensor 740. The camera 700 may be the same as the camera 110 described with reference to FIG. 1.

The communication interface 710 may be configured as a wired and/or wireless communication module. For example, the communication interface 710 may be a wireless communication module compatible with various mobile networks, Wi-Fi, Bluetooth, Zigbee, near field communication (NFC), or wireless broadband Internet, and/or a wired communication module compatible with LAN/Ethernet, not being limited thereto, to be connected to the network 130 in FIG. 1. The communication interface 710 may perform wired/wireless communication with the management device 120 through the network 130.

The storage 720 may store a certificate issued so as to include device binding information generated based on device information, and stores a public key included in the certificate and a private key having a cryptographic relation with the public key. The device information corresponds to identification information about the camera 700 to distinguish it from other devices. In one embodiment, the device information may include at least a part of a Medium Access Control (MAC) address of the communication interface 710. In another exemplary embodiment, the communication interface 710 may include at least a part of hardware information, hardware address information, and a serial number of the wired or wireless communication module.

The storage 720 may temporarily or permanently store data processed by the camera 700. The storage may include magnetic storage media or flash storage media, not being limited thereto.

In an exemplary embodiment, the storage 720 may be separated into a general storage 721 and a secure storage 723 having a higher security level than the general storage 721. The secure storage 723 may store data to be protected from an external unauthorized access such as a public key, a private key, and a certificate. The secure storage 723 can be implemented together with the controller 730 and the storage 720, collectively in the form of a secure environment. For example, a general execution environment in a camera may be referred to as an execution environment with a low security level, for example, a Rich Execution Environment (REE). Also, a security execution environment distinguished from the general execution environment is an execution environment having a high security level, for example, may be called a Trusted Execution Environment (TEE). The secure execution environment can, for example, store data requiring a relatively high security level in a secure environment, and perform related operations. The camera 700 may, for example, store an encryption key required to perform an encryption function in a secure execution environment, and may execute a cryptographic function such as digital signing, verification, encryption, or decryption using the encryption key in a secure execution environment. The secure execution environment of the camera 700 may operate on an application processor included in a device, or may operate on a separate trusted hardware architecture. The security execution environment can operate in a security domain, for example, by dividing an application processor or a memory into a general domain and a security domain. The security execution environment can be configured such that software or hardware requiring security can be operated only in a security area. Applications executed in the general execution environment can access an operation result of the security execution environment through a shared memory for both the general execution environment and the security execution environment, and also through an application programming interface (API) for the security execution environment. The secure execution environment may be referred to as, for example, TrustZone, IPT, Secure Enclave, or the like.

The controller 730, through the communication interface 710, may receive a connection request from the management device 120 of FIG. 1, transmit the certificate to the management device 120, and establish a protected session with the management device 120 according to a result of determining that the certificate of the camera 700 is valid at the management device 120 at least partially based on device binding information and device information.

The controller 730 may include any kind of device capable of processing data, such as a processor. Herein, the term "processor" may refer to a data processing device embedded in hardware, for example, having a circuit physically structured to perform a function represented by a code or an instruction contained in the program. An example of the data processing device embedded in hardware may include a microprocessor, a central processing unit (CPU), a processor core, a multiprocessor, an application-specific integrated circuit (ASIC) circuit, and a field programmable gate array (FPGA), but the scope of the present invention is not limited thereto.

The image sensor 740 may convert the image input by the lens into an electrical signal. For example, the image sensor 740 may be a semiconductor device capable of converting an optical signal into an electrical signal such as a charge-coupled device (CCD) or a complementary metal oxide semiconductor (CMOS).

In one exemplary embodiment, the device information about the camera 700 includes at least a part of identification information provided by the secure storage 723 having a high security level, and identification information about the controller 730, or the image sensor 740.

Figure 8:
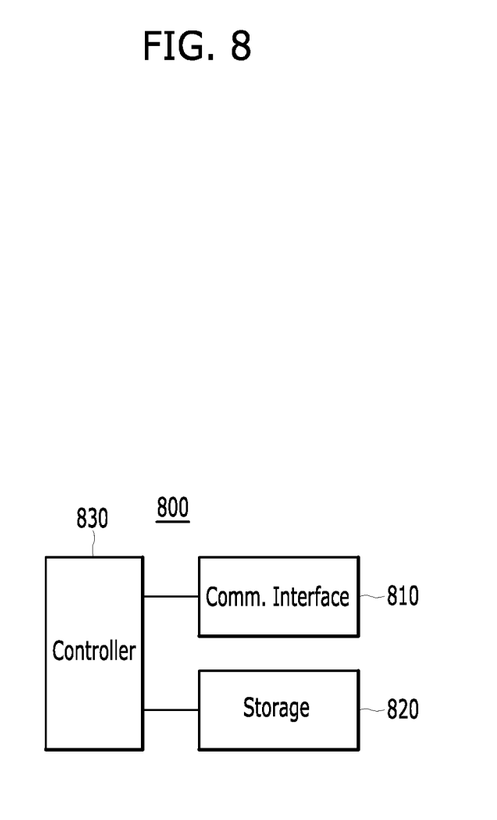
FIG. 8 is a block diagram of a management device according to an exemplary embodiment.

FIG. 8 is a block diagram of a management device according to an exemplary embodiment. A management device 800 according to an exemplary embodiment may be configured to include a communication interface 810, a storage 820, and a controller 830. The management device 800 corresponds to the management device 120 described with reference to FIG. 1.

The communication interface 810 may perform wired/wireless communication with the camera 110 (or 700) through the network 130.

The storage 820 may store the device information about the camera 110.

The controller 830 is operatively coupled to the communication interface 810 and the storage 820, and configured to establish a protected session with the camera 110 based on a result of a validity check of a certificate of the camera. The controller 830 is configured to receive, from the camera, the certificate of the camera via the communication interface 810, and determine the certificate is valid at least partially based on the device information stored in the storage 820 and the device binding information included in the certificate. Determining the validity of the certificate of the camera may be performed by determining whether the device binding information includes the device information, determining whether a digital signature of a certificate authority is valid, and determining whether the pining information about the certificate matches pre-stored pinning information about the camera 110. The pinning information about the certificate may include a hash value for the certificate.

The device authentication method according to the above exemplary embodiments can be implemented as computer-readable codes in a computer-readable storage medium. A computer-readable storage medium includes all kinds of storage devices in which data that can be read by a computer system is stored. Examples of the computer-readable storage medium include a read-only memory (ROM), a random access memory (RAM), compact disc (CD)-ROM, magnetic tape, floppy disk, optical data storage, and the like, not being limited thereto. In addition, the computer-readable storage medium may be distributed over a network-connected computer system so that a computer readable code can be stored and executed in a distributed manner. In addition, functional programs, codes, and code segments for implementing the exemplary embodiments can be easily deduced by programmers skilled in the art to which the inventive concept pertains.

The inventive concept may be embodied in other specific forms without departing from its spirit or essential characteristics. The described exemplary embodiments are to be considered in all respects only as illustrative and not restrictive. The scope of the inventive concept is, therefore, indicated by the appended claims rather than by the foregoing descriptions. All changes which come within the meaning and range of equivalency of the claims are to be embraced within the inventive concept.

What is claimed is:

1. A device authentication method comprising:
   connecting to a device through a network;
   receiving, from the device, a certificate of the device comprising device binding information about the device, the device binding information comprising first device information associated with the device binding information;
   transmitting, to the device, a request message for requesting second device information about the device when a management device does not store the second device information in a storage of the management device;
   receiving, from the device, the second device information in response to the request message;
   determining, by the management device, whether device binding information included in the certificate is generated based on the second device information; and
   determining, by the management device, whether the certificate is valid by comparing first hash data related to pre-stored certificate information with second hash data related to the certificate; and
   establishing a protected communication session with the device in response to the certificate being determined to be valid,
   wherein based on at least a portion of the second device information being included in the device binding information, the device binding information is generated based on the second device information,
   wherein based on the first hash data matching the second hash data, the certificate is determined as valid and
   wherein the first device information is generated based on at least a part of a medium access control (MAC) address and at least a portion of a controller, a storage and an image sensor included in the device.

2. The device authentication method of claim 1, wherein the first device information and the second device information represent identification information about the device for identifying the device from other devices.

3. The device authentication method of claim 2, wherein the device binding information represents that the certificate has been issued for the device identified by the first device information.

4. The device authentication method of claim 3, wherein the second device information comprises at least a part of a Medium Access Control (MAC) address of a communication interface included in the device.

5. The device authentication method of claim 4, wherein the second device information comprises information about a component constituting the device.

6. A camera authentication method comprising:
connecting to a management device through a network;
transmitting, to the management device, a certificate of a device comprising device binding information about the device, the device binding information comprising first device information associated with the device binding information;
receiving, from the management device, a request message for requesting second device information about the device when a management device does not store the second device information in a storage of the management device; and
transmitting, to the management device, second device information in response to the request message,
wherein based on at least a portion of the second device information being included in the device binding information, the device binding information is generated based on the second device information, and
wherein the first device information is generated based on at least a part of a medium access control (MAC) address and at least a portion of a controller, a storage and an image sensor included in the device.

7. A management device for a camera comprising:
a communication interface configured to communicate with the camera;
a storage configured to store device information about the camera; and
a controller operatively coupled to the communication interface and the storage, and configured to:
connect to the camera through a network;
receive, from the camera, a certificate of the camera comprising device binding information about the camera, the device binding information comprising first device information associated with the device binding information;
transmit, to the camera, a request message for requesting second device information about the camera when the management device does not store the second device information in a storage of the management device;
receive, from the camera, the second device information in response to the request message;
determine whether the device binding information included in the certificate is generated based on the second device information;
determine whether the certificate is valid by comparing a first hash data related to pre-stored certificate information with a second hash data related to the certificate; and
establish a protected communication session with the camera in response to the certificate being determined to be valid,
wherein based on at least a portion of the second device information being included in the device binding information, the device binding information is generated based on the second device information,
wherein based on the first hash data matching the second hash data, the certificate is determined as valid, and wherein the first device information is generated based on at least a part of a medium access control (MAC) address and at least a portion of a controller, a storage and an image sensor included in the device.

8. The management device of claim 7, wherein the second device information comprises at least a part of a Medium Access Control (MAC) address of a communication interface included in the camera.

9. The management device of claim 8, wherein the certificate is expressed in a form of X.509v3, and
wherein the device binding information is included in a SubjectPublickeyInfo field or an extension field.

10. The management device of claim 7, wherein the controller is further configured to control the communication interface to establish the protected communication session via SSL (Secure Socket Layer) protocols in response to validating the certificate.

11. A camera comprising:
a communication interface configured to communicate with a management device;
an image sensor configured to capture image data;
a storage configured to store a certificate of the camera, and store a public key included in the certificate and a private key generated to have a cryptographic relation with the public key; and
a controller operatively coupled to the image sensor and the storage, and configured to:
connect, to a management device through a network;
transmit, to the management device, the certificate comprising device binding information about the camera, the device binding information comprising first device information associated with the device binding information;
receive, from the management device, a request message for requesting second device information about the camera when the management device does not store the second device information in a storage of the management device;
transmit, to the management device, second device information in response to the request message; and
establish a protected communication session with the management device based on a result of determining whether the certificate is valid at the management device,
wherein based on at least a portion of the second device information being included in the device binding information the device binding information is generated based on the second device information, and
wherein the first device information is generated based on at least a part of a medium access control (MAC) address and at least a portion of a controller, a storage and an image sensor included in the device.

12. The camera of claim 11, wherein the first device information and the second device information represent identification information about the camera for identifying the camera from other devices.

13. The camera of claim 12, wherein the first device information comprises at least a part of a Medium Access Control (MAC) address of the communication interface.

* * * * *